United States Patent [19]

Slazas

[11] 4,416,109
[45] Nov. 22, 1983

[54] MOWER ATTACHMENT DRAFT LINKAGE RESPONDING TO GROUND CONTOUR

[75] Inventor: John J. Slazas, Cedarburg, Wis.

[73] Assignee: Simplicity Manufacturing, Inc., Port Washington, Wis.

[21] Appl. No.: 455,006

[22] Filed: Jan. 3, 1983

[51] Int. Cl.³ .............................................. A01D 35/28
[52] U.S. Cl. ..................................... 56/209; 56/15.8; 56/17.1; 56/DIG. 22; 280/112 A
[58] Field of Search ...................... 56/15.2, 15.7, 15.8, 56/15.9, 17.1, 17.2, DIG. 22, 208, 209; 280/112 A

[56] References Cited

U.S. PATENT DOCUMENTS

| | | | |
|---|---|---|---|
| 2,924,928 | 2/1960 | Rhoades et al. | 56/15.8 |
| 3,408,798 | 11/1968 | Hale et al. | 56/DIG. 22 |
| 3,792,748 | 2/1974 | Regier | 280/112 A |
| 4,071,259 | 1/1978 | Ernest | 280/112 A |
| 4,106,269 | 8/1978 | Knudson | 56/15.8 |

Primary Examiner—Robert P. Swiatek
Assistant Examiner—David J. Tarnoff
Attorney, Agent, or Firm—James E. Nilles

[57] ABSTRACT

A mower hitch support (103) pivoted to the front of a tractor (11) has a connection (126, 128, 132) with an axle link (46) interconnecting front wheels (17, 18) mounted individually on the tractor frame (12) to cause an underslung mower to tilt laterally in response to the front wheels encountering undulations in the ground thereby substantially avoiding scalping of the lawn.

5 Claims, 5 Drawing Figures

MOWER ATTACHMENT DRAFT LINKAGE RESPONDING TO GROUND CONTOUR

BACKGROUND OF THE INVENTION

1. Technical Field

This invention relates to a hitching arrangement by which a mower is connected in underslung relation to a tractor and, more particularly, to a hitching arrangement which causes the mower to be tilted in response to changes in relative vertical position of the front wheels of the tractor.

2. Prior Art Statement

Draft linkage for a mower attachment disposed in underslung relation to a tractor which causes the mower to respond to the contour of the ground traversed by the front wheels of the tractor is well known in the art as illustrated in U.S. Pat. No. 2,924,928 of Nolan Rhoades and Igor Kamlukin issued Feb. 16, 1960 for "Power Mower with Rotary Cutter."

It is also well known to provide individual wheel spindle supports for steerable wheels of a vehicle with the laterally upper end of the supports being pivotally connected to the main frame of the vehicle on a pair of laterally spaced and parallel longitudinal axes and having a transverse link with opposite ends pivotally connected to laterally inner, lower portions of the spindle supports for relative pivotal movement between the link and spindle supports about a second pair of longitudinal axes parallel to the first pair of longitudinal axes. Such an axle construction is illustrated and described in U.S. Pat. No. 4,071,259 issued to David R. Ernest on Jan. 31, 1978 for "Vehicle Wheel Suspension System."

OBJECTS AND SUMMARY OF THE INVENTION

This invention has particular utility in a lawn and garden tractor having a main frame supported at its front end by a pair of laterally spaced front steerable wheels. A pair of laterally extending spindle supports have their laterally inner ends pivotally connected at laterally spaced points to the front end of the main frame for vertical swinging movement about a first pair of parallel, longitudinal axes. A pair of spindles, which rotatably support the front wheels, have upright portions pivotally connected to laterally outer portions of the spindle supports for steering movement about generally upright steering axes. A laterally extending link is pivotally connected at its opposite ends to laterally inner ends of the spindle supports on a second pair of longitudinal axes which are parallel to and spaced below the first pair of longitudinal axes. A mower is attached in underslung relation to the tractor and includes at least one rotary cutting blade disposed in a housing. A longitudinally extending rigid hitch member is pivotally connected at laterally spaced points to the front of the mower housing. In order to cause the mower hitch member and the housing to follow the contour of the ground, a transversely extending mower hitch support is provided which is pivotally connected intermediate its ends to the front end of the tractor main frame for pivotal movement about a central longitudinal axis. Pivot means pivotally connect laterally opposite ends of the hitch member to laterally spaced portions of the front end of the hitch member for vertical swinging movement of the latter about a transverse pivot axis. In addition, a pivot connection between the axle link and a portion of the hitch support disposed below the central longitudinal axis, causes the hitch support to swing about its central longitudinal axis during an operation over uneven ground. The transverse axis by which the hitch member is supported to the hitch support will be disposed in substantially parallel relation to the ground traversed by the front wheels as the front wheels and their spindle supports pivot about the first pair of longitudinal parallel axes by which the spindle supports are secured to the main frame.

It is a general object of the present invention to provide an attaching arrangement for a mower which causes the mower to follow the lateral or transverse contour of the ground as sensed by individually mounted front wheels.

It is a more specific object of this invention to provide a mower hitching arrangement for tractor having front wheel spindle supports individually pivoted to the main frame and interconnected by an axle link wherein the hitching arrangement causes the mower to adjust to the transverse contour of the ground as sensed by the front wheels.

BRIEF DESCRIPTION OF THE DRAWINGS

A preferred embodiment of the invention is illustrated in the drawings in which.

DETAILED DESCRIPTION OF THE PREFERRED EMBODIMENT

Figure 1:
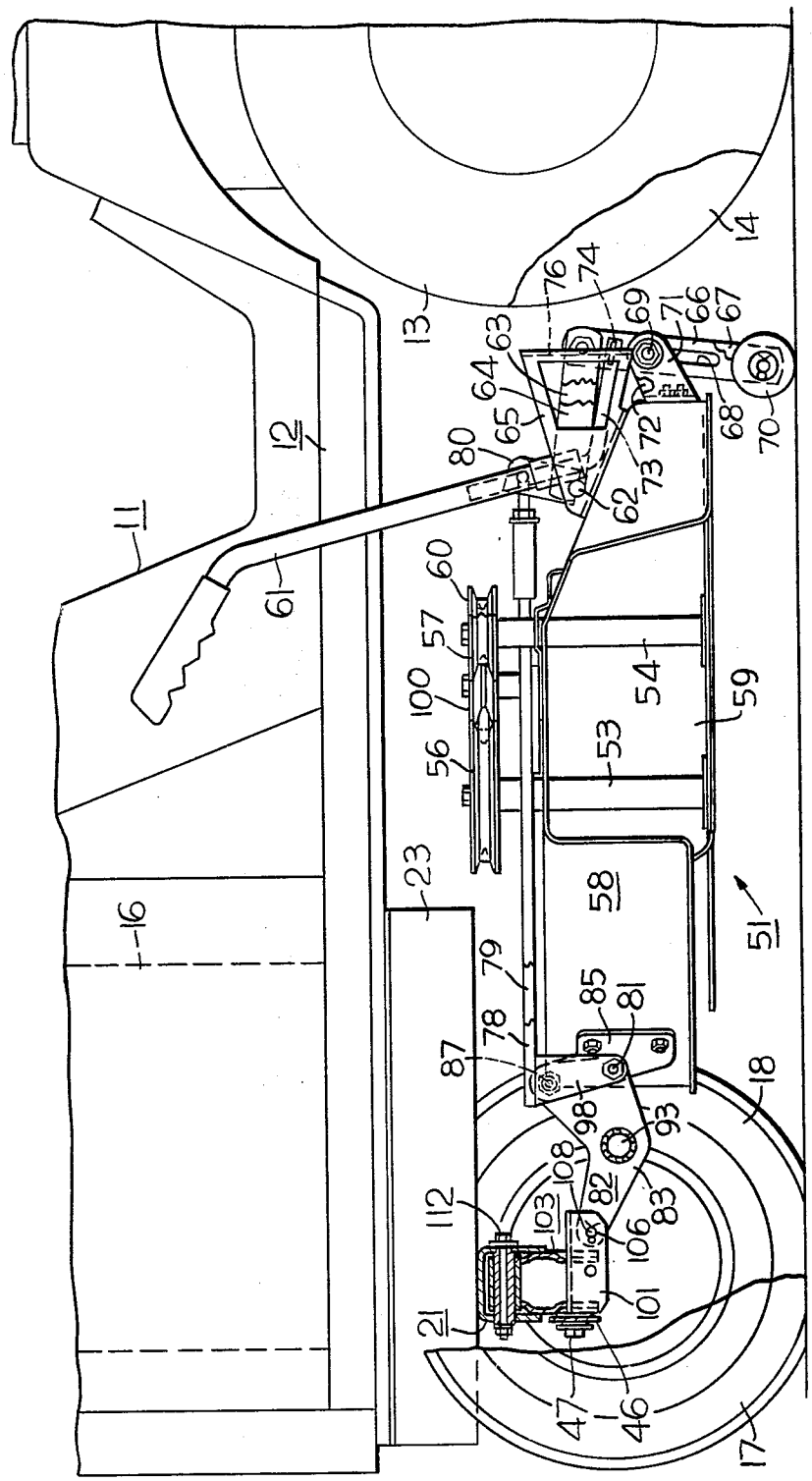
FIG. 1 is a partial side view of a tractor and mower combination with parts broken away for illustration purposes.
Figure 2:
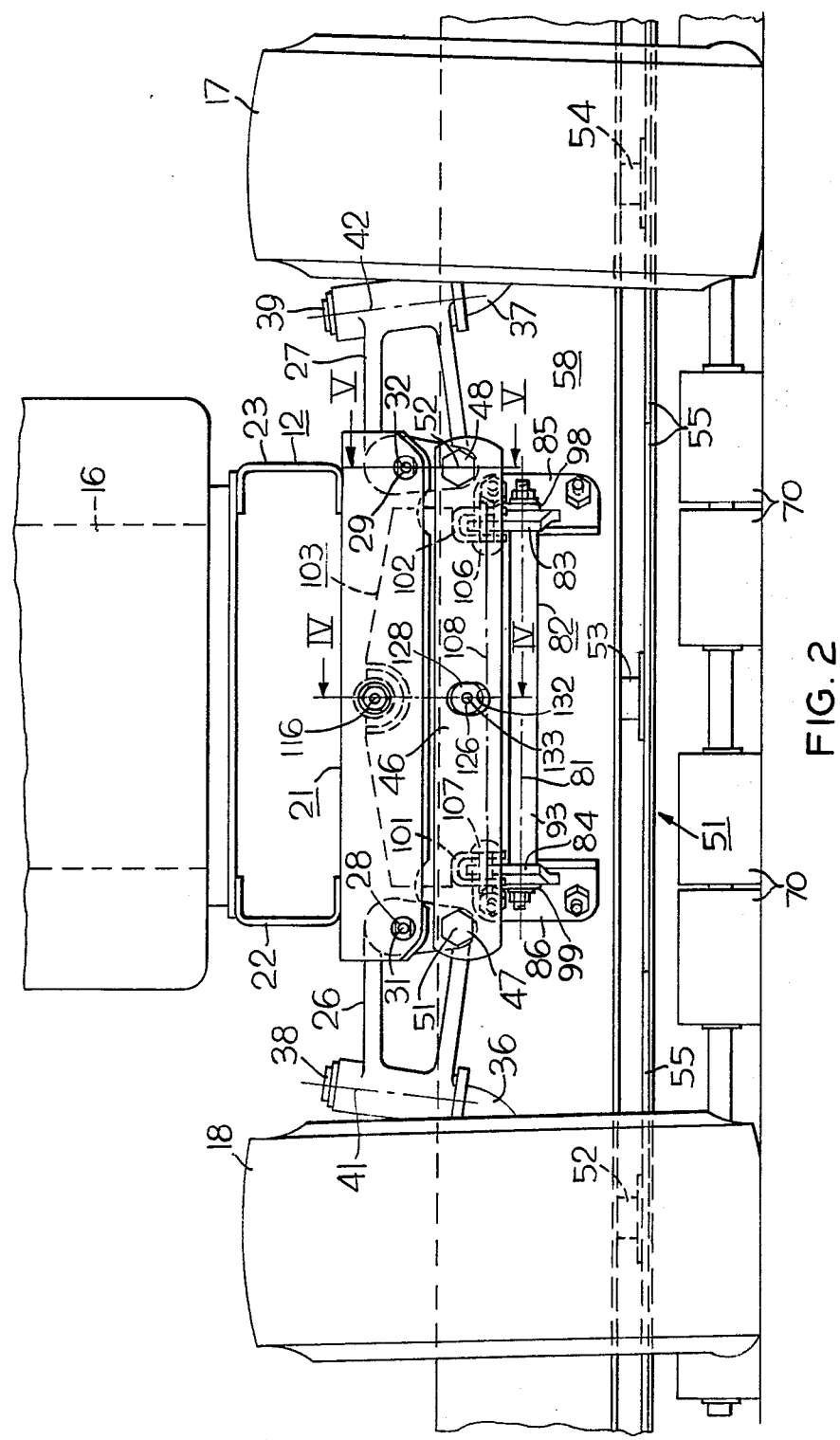
FIG. 2 is a front view of the tractor and mower combination shown in FIG. 1.
Figure 4:
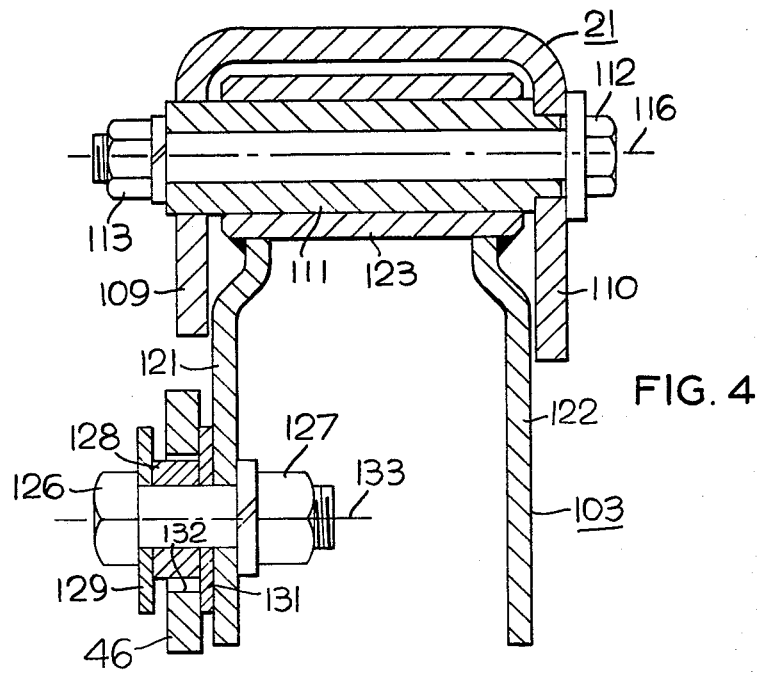
FIG. 4 is a section taken along the line IV—IV in FIG. 2.
Figure 5:
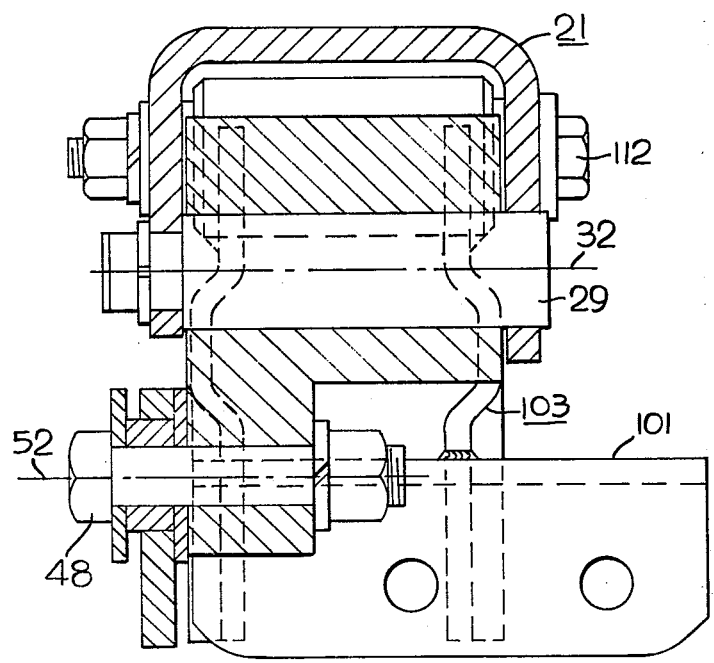
FIG. 5 is a section view taken along the line V—V in FIG. 2.

Referring to FIG. 1, a lawn tractor 11 has a main frame 12 supported at its rear end by a pair of traction wheels 13, 14 driven through a drive train (not shown) by a front mounted engine 16. A pair of non-driven steerable wheels 17, 18 support the front end of the main frame 12. Referring also to FIGS. 2, 4 and 5, the front end of the main frame 12 includes an inverted U-section channel 21 secured as by welding to the lower front ends of a pair of longitudinally extending channel members 22, 23 of the main frame 12. A pair of wheel spindle supports 26, 27 are pivotally connected to the front end of the main frame 12 and more specifically to laterally opposite ends of channel 21 by a pair of pivot pins 28, 29 secured to the downwardly extending flanges 109, 110 of the channel 21. The support spindles 26, 27 pivot about a pair of longitudinal axes 31, 32 which are parallel to and spaced laterally from one another a substantial distance. A pair of wheel spindles 36, 37 rotatably support the front wheels 17, 18 and have upstanding portions 38, 39 pivotally connected to the laterally outer ends of the spindle supports 26, 27 for steering movement about generally upright axes 41, 42. The lower laterally inner portions of the spindle supports 26, 27 are interconnected by a transverse axle link 46 which has its laterally opposite ends pivotally connected to the supports 26, 27 by a pair of pivot bolts 47, 48 permitting pivotal movement of the link 46 relative to the spindle supports 26, 27 about a pair of longitudinal, parallel axes 51, 52 which are parallel to axes 31, 32. Axis 51 is spaced below axis 31 the same distance by which axis 52 is spaced below axis 32, thereby providing a quadrilateral linkage in which the vertical links are of an equal length. This type wheel support provides improved tractor stability on side slopes as explained in previously mentioned U.S. Pat. No. 4,071,259.

A mower attachment 51 is disposed in underslung relation to the tractor 11 and includes three rotatable spindles 52, 53, 54 having suitable cutting blades 55 secured to their lower ends and V-belt pulleys 56, 57, 60 secured to their upper ends. The blades are disposed within a mower housing 58 which includes a discharge opening 59 at the left-hand side thereof as illustrated in FIG. 1. The mower blades are driven by a V-belt (not shown) engaging the pulleys 56, 57, 60, and an idler 100 and is connected to a pulley (not shown) on an output shaft of the engine 16. The mower housing 58 is raised and lowered relative to the ground by a hand lever 61 welded to a cross shaft 62 of a mower height adjustment linkage. The cross shaft 62 is pivotally supported on a pair of laterally spaced brackets secured to the housing, only bracket 65 being shown. A pair of laterally spaced, rearwardly extending levers 63, 64 are welded to the shaft 62 and have rear ends pivotally connected to upright roller supports 66, 67 the lower ends of which support rollers 70. The roller supports 66, 67 each include a vertically extending slot 68 which cooperate with a transversely extending guide bolt 69 secured to each of a pair of laterally spaced brackets 71, 72 on the rear of the housing 58. A bent rod 73 is secured as by welding to the lower end of the lever 61 and has a detent portion 74 which cooperatively engages a serrated portion 76 of the bracket 65 to releasably hold the lift linkage in the position to which it is adjusted. A pair of longitudinally extending links 78, 79 are pivotally connected at their rear ends to laterally spaced upstanding brackets 80 welded to the cross shaft 62. The forward ends of the links 78, 79 include downwardly projecting flanges 98, 99, the lower ends of which are pivotally connected to longitudinally extending legs 83, 84 of a rigid hitch member 82 on a transverse axis 81. The upper, rear ends of the legs 83, 84 are pivotally connected to laterally spaced brackets 85, 86 on the mower housing 58 for pivotal movement relative thereto about a transverse axis 87. The rigid hitch member 82 includes a rigid transverse brace 93 welded at its opposite ends to the legs 83, 84. When the control lever 61 is moved forwardly and downwardly, the housing 58 will be lowered at both its front and rear ends through operation of the linkage heretofore described.

Figure 3:
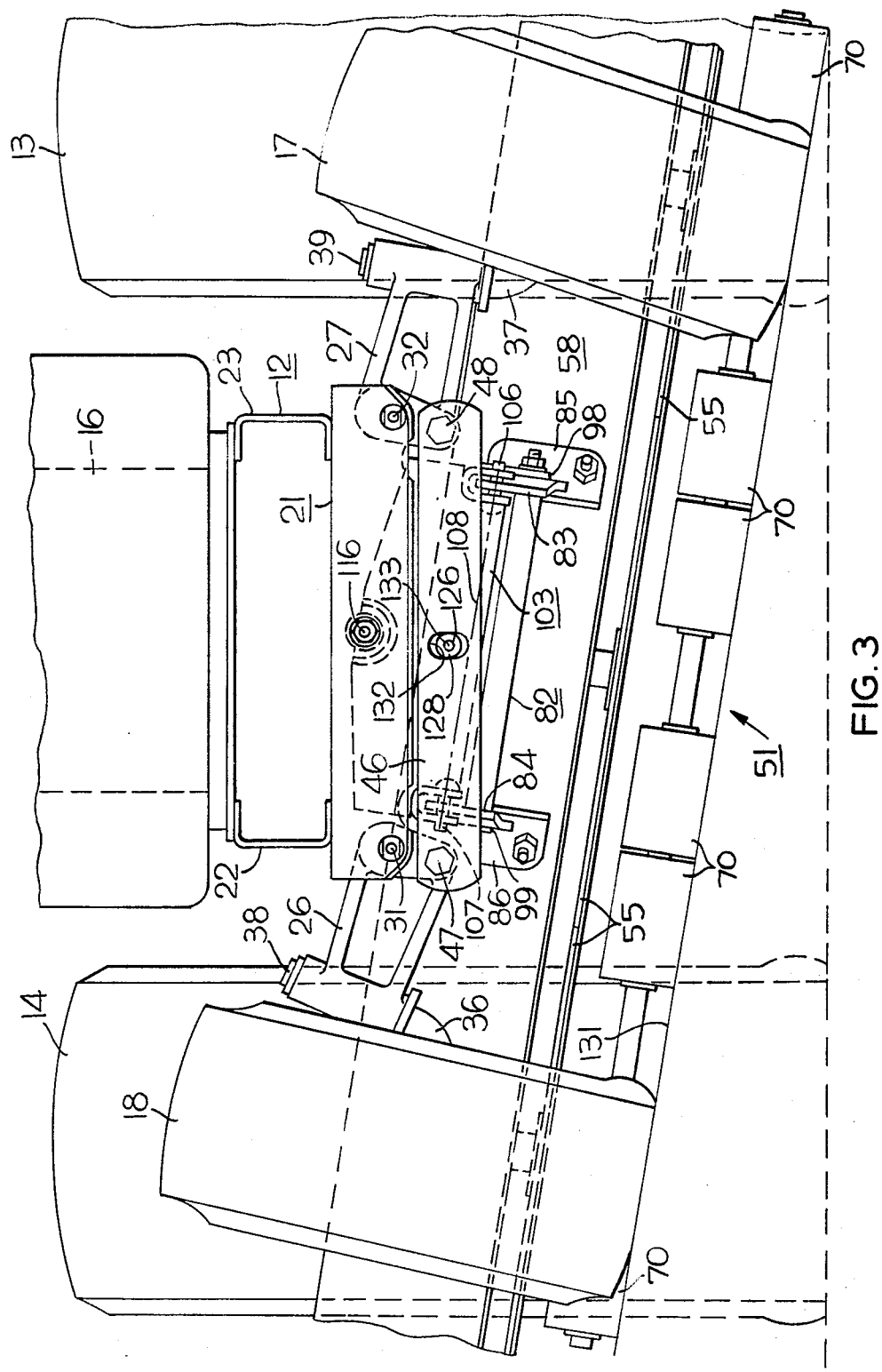
FIG. 3 is a front view similar to that of FIG. 2 but showing the front wheels of the tractor on uneven ground.

The forward ends of the legs 83, 84 of hitch member 82 are pivotally connected to a pair of inverted U-section hitch brackets 101, 102 which are welded to a transversely extending hitch support 103. The pivot connections between legs 83, 84 and the brackets 101, 102 are achieved by a pair of transverse pivot pins 106, 107 which are in alignment and define a transverse pivot axis 108. The mower hitch support 103 is pivotally connected at its upper end, as illustrated in FIG. 4, to the downwardly extending flanges 109, 110 of channel member 21 by pivot sleeve 111 maintained in place by a bolt 112 and nut 113. The hitch support 103 pivots relative to the main frame of the tractor about a central longitudinal pivot axis 116, which is also the axis of bolt 112. The mower hitch support 103 has a pair of longitudinally spaced downwardly depending walls 121, 122 which are welded to a bushing 123 through which the sleeve 111 extends and are welded at their laterally outer ends to the hitch brackets 101, 102. In order to cause the mower to tilt to correspond to the lateral contour of the ground as sensed by the front wheels, the hitch support 103 is caused to pivot about axis 116 by a lateral thrust connection between the hitch support 103 and the axle link 46. The lateral thrust connection of the mower hitch support 103 with the axle link 46 is achieved by a pivot bolt or pin 126 secured to the wall 121 by a nut 127 and a sleeve 128 disposed between a pair of washers 129, 131 on the pin with the sleeve 128 being in lateral thrust transmitting engagement with confronting sidewalls of a vertically elongated, longitudinal opening 132 in axle link 46. The opening 132 in the axle link 46 is vertically elongated, as illustrated in FIGS. 2, 3 and 4, to compensate for the difference in length of the radius on which the axis 133 of bolt 126 swings about axis 116 (the distance between axes 116 and 133) as compared to the radii of the circles subscribed by the axes 51, 52 as the spindle supports 26, 27 rotate about the longitudinal axes 31, 32. The larger radius for the swinging movement of pin 126 is required in the illustrated embodiment of the invention to cause the mower to tilt laterally, in response to the relative vertical positions of the front wheels, so as to cause the mower to tilt laterally to correspond to a vertical deviation in the ground as sensed by the front wheels.

Referring to FIG. 3, it will be noted that the front wheels have encountered a lateral incline while the rear wheels 13, 14 have remained on level land. While the main frame remains level, the spindle supports 26, 27 pivot about the longitudinal axes 31, 32 causing the axle link 46 to shift laterally. The lateral shifting movement of axle link 46 causes the mower hitch support 103 to pivot about the central longitudinal axis 116 of its pivot connection to the main frame 12 by virtue of the hitch support 103 being connected to the axle link 46 by the bolt 126 and the cylindrical thrust member or bushing 128. This results in the mower hitch member 82 and mower housing 58 swinging to the position illustrated in FIG. 3 wherein the mower hitch axis 108 remains generally parallel to the laterally sloping ground level 131 traversed by the front wheels 17, 18. The support rollers 70 at the right-hand side of the mower (left side as viewed in FIG. 3) will be raised off the ground if the vertical deviation in the ground encountered by the front wheel at that side is sufficiently great. This adjusting movement of the mower substantially avoids scalping of the lawn when traversing ground irregularities. For illustration purposes, the mower is shown in its highest position of adjustment in FIG. 3 and it should be understood that the mower is normally lowered to cut the grass somewhat shorter.

This invention provides a hitching arrangement for connecting an underslung mower to the front of the tractor having individually connected front wheels (rather than an oscillating axle carrying the front wheels) whereby the mower is tilted laterally by the hitch support 103 to prevent scalping of the lawn being mowed. The lateral shifting of the axle link 46 of the front wheel equalizing support is utilized to swing the mower hitch support 103 the desired amount to cause the mower tilt to correspond to the movement of the front wheels 17, 18 with respect to the main frame 12.

The embodiments of the invention in which an exclusive property or privilege is claimed are defined as follows:

1. In combination with a tractor having a longitudinally extending main frame supported at its front end by a pair of laterally spaced steerable wheels and at its rear end by a pair of laterally spaced traction wheels,
   a pair of laterally extending spindle supports having their laterally inner ends pivotally connected to laterally spaced points of said front end of said main frame for vertical swinging movement about a first pair of parallel longitudinal axes,
   a pair of spindles rotatably supporting said front wheels and having upright portions pivotally connected to laterally outer portions of said spindle supports, respectively, for steering movement relative thereof about a pair of generally upright laterally spaced steering axes,
   a laterally extending axle link having its laterally opposite ends pivotally connected to the laterally inner ends of said spindle supports on a second pair of longitudinal axes parallel to and spaced below said first pair of longitudinal axes,
   a mower in underslung relation to said tractor including at least one rotary cutting blade and a housing for said blade,
   a longitudinally extending hitch member connected to laterally spaced portions of said mower housing,
   a transversely extending mower hitch support pivotally connected intermediate its laterally opposite ends to said front end of said frame for pivotal movement about a central longitudinal axis,
   pivot means pivotally connecting said laterally opposite ends of said hitch support to laterally spaced portions of the front end of said hitch member for vertical swinging movement of the latter about a transverse pivot axis, and
   a lateral thrust connection between a central part of said axle link and an intermediate part of said hitch support disposed below said central longitudinal axis, said thrust connection being operable to swing said hitch support about said central longitudinal axis to maintain said transverse axis in substantially parallel relation to the ground traversed by said front wheels during predetermined swinging movement of said spindle supports about said first pair of longitudinal axes.

2. The combination of claim 1 wherein said lateral thrust connection includes a cylindrical member connected on a longitudinal axis to one of said parts and wall means defining a longitudinal opening on the other of said parts having laterally confronting sidewalls in thrust transmitting engagement with said cylindrical member.

3. The combination of claim 1 wherein said hitch member is pivotally connected to said mower housing on a transverse pivot axis.

4. The combination of claim 1 wherein said lateral thrust connection is spaced below said central longitudinal axis a greater distance than the distance by which said second pair of axes are spaced below said first pair of axes.

5. The combination of claim 4 wherein said hitch member is pivotally connected to said mower housing on a transverse pivot axis.

* * * * *